United States Patent [19]

Caruso

[11] 4,337,797
[45] Jul. 6, 1982

[54] BIMETALLIC VALVE SPOOL

[75] Inventor: John T. Caruso, Kenmore, N.Y.

[73] Assignee: Moog Inc., East Aurora, N.Y.

[21] Appl. No.: 178,778

[22] Filed: Aug. 18, 1980

[51] Int. Cl.³ .......................................... F15B 13/043
[52] U.S. Cl. ......................... 137/625.48; 137/625.64;
137/625.66; 137/625.69; 251/324; 251/368
[58] Field of Search ..................... 137/625.62, 625.64,
137/625.66, 625.69, 625.48; 251/368, 324

[56] References Cited

U.S. PATENT DOCUMENTS 2,410,404 11/1946 Buchanan ...................... 251/368 X
2,908,292 10/1959 Beckett et al. .................... 251/324

Primary Examiner—Gerald A. Michalsky
Attorney, Agent, or Firm—Sommer & Sommer

[57] ABSTRACT

A high response servovalve has an improved valve spool slidably mounted within the bore at a sleeve or body. The bearing surfaces on the spool are formed of a relatively soft material. The balance of the surfaces of the spool and the sleeve or body are relatively hard. The soft bearing material tends to absorb contaminants between the bearing lands and the sleeve, is self-healing, and is not prone to weld to the facing sleeve or body surface.

8 Claims, 1 Drawing Figure

BIMETALLIC VALVE SPOOL

BACKGROUND OF THE INVENTION

1. Field of the Invention

The present invention relates generally to the field of electrohydraulic servovalves, and more particularly to servovalves having high dynamic response in which a spool may be commanded to move at high velocities relative to a surrounding sleeve, bushing, or body.

2. Description of the Prior Art

It is known to provide a two-stage electrohydraulic servovalve with second-stage sliding spool, the position of which relative to a body or sleeve modulates flow through the valve's hydraulic control section. Four examples of such a servovalve are shown in U.S. Pat. Nos. 3,023,782, 3,103,739, 3,228,423, and 3,257,911. The several disclosures of which are hereby incorporated by reference.

While their outward configurations are known, the spool member and the cooperative member in which the bore is provided, have both been typically formed of a relatively hard material, such as 440C stainless steel. Such members have also been formed of a less hard material, to facilitate machining, and then subjected to a suitable surface hardening treatment. Such hard material and surface treatment, have been deliberately employed so that the flow metering edges and lands on the spool and bore members, would be hard and long lasting.

Servovalves have found use in an ever-increasing number of applications. In most applications, provision of a "hard" spool and "hard" mating surfaces on the bore member, is completely acceptable.

However, in other high performance applications, typically where the spool is required to move relative to the sleeve with peak velocities on the order of 40 inches per second or greater, the bearing surfaces on the spool and bore member have a tendency to chafe or gall. In such use, conventional servovalves have been found to have an unpredictable life, and often fail by a "stuck" spool which has welded itself to the bore member. Upon examination, it has been noticed that such welding usually occurs in the vicinity of the bearing lands, which remain in metal-to-metal engagement with the bore member throughout the limits of spool motion association with normal servovalve operation.

As a practical matter, contaminant particles are always present in the hydraulic fluid being controlled. It is felt that valve failure may be caused, at least in part, by the presence of micrometer-size contaminant between the bearing surfaces of the spool and bore members. Also it is felt that such failure is aggravated by side loading of the spool bearing lands from nonconcentric spool centering springs, such as may exist in FIG. 1 of U.S. Pat. No. 3,228,423, or from non-concentric spool end driving surfaces such as may be created in FIG. 7 of U.S. Pat. No. 3,257,911 should the reduced diameter spool sections be formed by individual cylindrical members.

SUMMARY OF THE INVENTION

The present invention provides an improved servovalve in which the bearing lands are formed of a relatively soft material.

Accordingly, the invention broadly provides an improvement in a valve including a member provided with a bore and having a plurality of ports through which fluid may flow. The spool member is slidably mounted in the bore and has a plurality of flow metering lands and edges cooperating with the bore member ports such that the relative positions between the members may selectively define metering orifices through which fluid may controllably flow.

Whereas the spool and sleeve members continue to be formed of relatively hard materials or have relatively hard surfaces, the bearing lands are provided in a relatively soft material suitably bonded, affixed or attached to one of the members.

As used herein, the member provided with the bore in which the spool is slidably mounted, may be either a sleeve, a bushing, a body, or some other structure. Accordingly, such "member," sometimes herein referred to as a "bore member," should be broadly construed.

Accordingly, one object of the present invention is to provide an improved valve which is particularly suited for use in high performance applications requiring high dynamic response.

Another object is to provide an improved valve wherein the tendency of spool and bore members to gall is reduced.

Another object is to provide a high response servovalve capable of an extended service life.

These and other like objects and advantages will become apparent from the foregoing and ongoing specification, the drawings and the appended claims.

DESCRIPTION OF THE PREFERRED EMBODIMENTS

Figure 1:
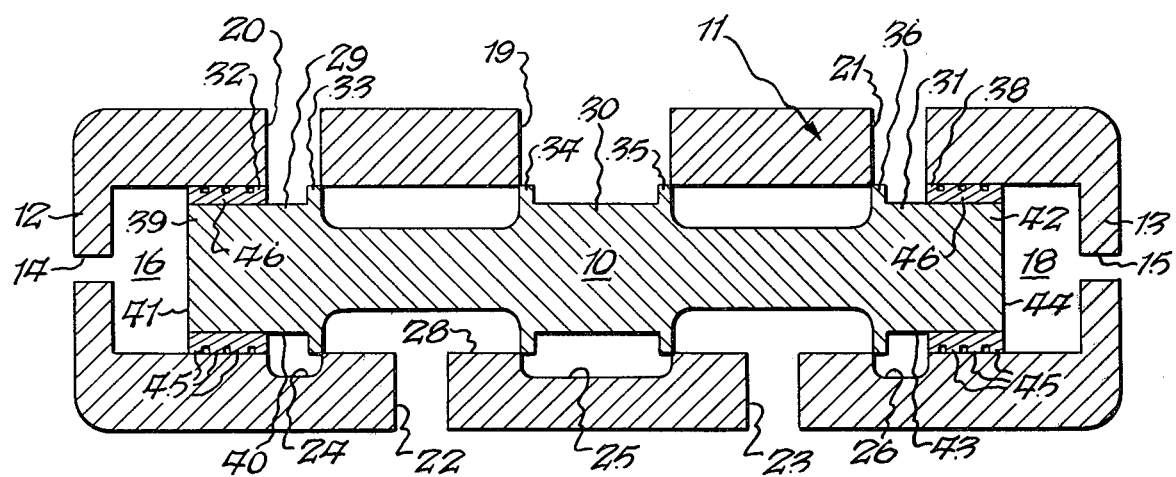
FIG. 1 is a longitudinal vertical sectional view of an improved spool slidably mounted within the sleeve of an electrohydraulic servovalve.

At the outset, it should be clearly understood that like reference numerals are intended to identify the same elements and/or structure, as such elements and/or structure may be further described or explained by the entire written specification of which this detailed description is an integral part.

The present invention provides a unique improvement, which is particularly suited for use in high response electrohydraulic servovalves, to reduce the tendency of a valve spool to gall and weld to a surrounding bore wall of a cooperative bushing, sleeve, or body during high speed movement of the spool relative to the sleeve. In the presently preferred embodiment, the spool and sleeve are each formed of a relatively hard material, such as 440C stainless steel, having a hardness of about 55 to 65 on the Rockwell "C" Scale (hereinafter "$R_c$"). Less hard materials may also be used for convenience in manufacturing, and subjected to a subsequent surface hardening treatment. However, the marginal end portions of the spool are provided with bearing lands formed of a relatively soft material, preferably in the range of 45 to 100 on the Rockwell "B" Scale (hereinafter "$R_b$"). The intent of this invention is that contaminant particles which may become captured between the bearing lands and the sleeve, will, by design, be permitted to embed themselves in the soft bearing lands. Such deliberate absorption effectively removes the contaminant particles from the lubricated interface between the bearing lands and the sleeve, and is believed to consequently reduce the tendency of the spool and sleeve to gall and weld together.

The invention is depicted in FIG. 1 as including an improved valve spool 10 slidably mounted within a conventional sleeve or bushing 11. The invention may be similarly embodied in a valve slidably mounted in a bore provided in a valve body, or some other member.

The sleeve 11 is basically a horizontally-elongated cylindrical tube provided with a left end closure 12 and a right end closure 13. These end closures are penetrated by openings 14, 15, respectively, so that fluid may be selectively introduced into or withdrawn from the left and right spool end chambers 16, 18 by operation of a first stage hydraulic amplifier, as explained in one or more of the aforementioned patents. In the well known manner, a differential pressure and flow may be supplied to the spool end chambers to displace the spool in the desired direction. Sleeve 11 is shown as further provided with five radial openings: a central port 19 communicating with return or tank; left and right supply pressure ports 20, 21, each communicating with a source (not shown) of pressurized fluid; and left and right control ports 22, 23 which may be operatively connected to a hydraulically-operated device, such as an actuator (not shown). In the well known manner, annular slots having a partial circumferential length, or fully circumferential grooves, 24, 25, 26 extend into the sleeve from its cylindrical inner surface 28, and these slots or grooves communicate with ports 20, 19 and 21, respectively. While the sleeve is somewhat schematically shown in the drawings, it is of conventional design, and is formed of a relatively hard material, such as 440C stainless steel having a hardness on the order of $R_c$55–65. The control pressures in chambers 16, 18 are typically about one-half of the supply pressure; consequently, there is continuous laminar leakage flow from supply pressue chamber 24, 26, past the bearing land surfaces 45, to the spool end chambers 16, 18. This continuous flow carries with it micrometer-size contaminant.

Outwardly, the improved spool 10 appears to be of conventional three-lobe design, save for the provision of the unique bearing lands. In the spool's centered or null position shown in FIG. 1, the left lobe 29 operatively closes supply port 20, the intermediate lobe 30 operatively closes return port 19, and the right lobe 31 operatively closes supply port 21. Each of these lobes has a pair of axially-spaced metering lands. Specifically, left lobe 29 has lands 32, 33; the intermediate lobe has lands 34, 35; and the right lobe has lands 36, 38. The peripheral surface of each of these metering lands closely faces proximate portions of the sleeve inner surface 28. The outside metering edge of each land is accurately ground so as to be coincident with the control edge of the associated supply or return port, when the spool is in its null position. When the spool is in such null position, the supply and return ports are closed and there is no flow through the valve. If the spool is displaced rightwardly from this null position, land 36 of right lobe 31 will expose a metering orifice through which supply pressure may flow to control port 23. At the same time, control port 22 will communicate with drain through return port 19. The operation is similar, albeit reversed, if the spool moves leftwardly from the null position. In this manner, such selective positioning of spool 10 relative to sleeve 11, may control the flow of fluid with respect to a hydraulically-operated mechanism.

The range of movement of a spool in a servovalve having medium flow capacity (50 to 100 gpm at 1000 psi) is typically ±0.050 to ±0.10 inch about the central or null position (where it is shown in FIG. 1). If such a servovalve is commanded to move sinusoidally throughout its total flow control range at 100 Hz, then the peak spool velocity will be $$V_m = \omega x_p = 2\pi f x_p$$

where
$v_m$ = peak spool velocity
$\omega$ = sinusoidal frequency rad/sec
f = sinusoidal frequency Hz
$x_p$ = peak spool displacement or
$v_m = 2\pi 100(0.050$ to $0.10)$
$\simeq 30$ to 60 in/sec The peak velocity will be correspondingly higher for servovalves having higher spool stroke, or higher frequency command signals. It has been observed empirically that servovalves in which the peak spool velocity exceeds 40 in/sec, especially for a sustained period of time (as necessary for fatigue testing and seismographic exploration), then the phenomena of spool galling develops.

The improved spool 10 herein disclosed differs from prior art spools in that the bearing lands, upon which the spool is supported while in its precise null, or centered, position, are formed of a material dissimilar to the material of which the remainder of the spool is formed. As best shown in FIG. 1, the left marginal end portion 39 of the spool is formed to have a cylindrical surface 40 extending rightwardly from the spool left end face 41 to join left lobe land 33. Similarly, the right marginal end portion 42 of the spool has a cylindrical surface 43 extending leftwardly from the spool right end face 44 to join right lobe land 36. Except for the improved bearing lands, the spool may be constructed of the same relatively hard material of which the sleeve is formed.

It should be recognized that in some spool and sleeve configurations, an additional spool bearing land is provided at the center of the spool intermediate control lands 34, 35, with a corresponding sleeve wall bearing surface being provided by designs well known to those skilled in this art. In such spool and sleeve configurations, the use of soft bearing land material at this midspool bearing surface is desirable to avoid the galling problem prevalent in high response servovalves.

The bearing lands, severally indicated at 45, are provided in an annular body 46 of relatively soft material, which is provided on the spool marginal end portions, or at some other location where a bearing is desired. In the preferred embodiment, the bearing material is permanently deposited on the spool to a thickness large with respect to the size of the entrapped contaminant, such as 0.002 to 0.005 inch thickness, by means of a metal spray process. Alternatively, such bearing material may be provided by an electroplating process, or sleeves of such material may be press-fitted onto the spool marginal end portions. Of course, other techniques may also be employed to apply or affix the relatively soft material, from which the bearing lands are formed, to the spool.

After the soft material 46 has been deposited, or otherwise provided on the spool, it is machined and ground to provide a cluster of discrete bearing lands, severally indicated at 45. In the preferred embodiment, such material 46 is also formed to provide the outermost lands 32, 38 for the left and right lobes.

Heretofore, such a spool and sleeve have been both formed of relatively hard materials, such as stainless steel. The reason for this is that it is deemed essential that the metering edges and lands on the spool and/or sleeve, be hardened so as to afford the capability for long life. As a practical matter, contaminant particles are always present in hydraulic fluid, and can be highly abrasive. The spool-to-sleeve diametral clearance is typically in the range of from 2 to 20 micrometers. Hence, the radial clearance may be on the order of 1 to 10 micrometers. Typical high performance servosystems have filters capable of only screening out particles on the order of 15 micrometers and larger. Hence, the hydraulic fluid will commonly contain contaminant particles which may position themselves between the bearing surfaces.

In use, it is felt that the metering orifices are flushed and cooled by the fluid flow therethrough. However, this is not true of the space between the bearing lands and the proximate wall of the sleeve. At the same time, the fluid acts as a carrier for contaminant particles which, if they were to interpose themselves between the bearings and the sleeve, could contribute to galling and ultimately cause the valve to fail by virtue of the spool welding to the sleeve.

The exact reason for such failure is theory. However, it has been noted that the problem of galling appears to be peculiar to those servovalves which have a high dynamic response. For example, such a servovalve might be used to operate a vibrating device. In such case, the spool might be commanded to oscillate back and forth throughout a substantial portion of the operating positional range at a high frequency. The velocity of the spool as a function of time might be sinusoidal, and have a peak amplitude velocity of 40 inches per second or greater.

Under such high speed conditions, the relatively slower moving fluid present between the bearings and the sleeve might cause localized fluid heating, and consequent loss of lubricity. Also, the contaminant present in the clearance gap between the spool bearing lands and the sleeve may not be able to move so as to avoid a mechanical obstruction between the rapidly moving spool and stationary sleeve. The presence of such a chip or chips might also cause cocking of the spool relative to the sleeve. Indeed, manufacturing tolerances and imperfect spool and sleeve bore geometry may also contribute to eccentricity and non-uniform bearing loading.

While the problems attributed to such imperfections have been recognized, it is believed that the prior art failed to afford a viable solution. In such prior art servovalves, both the spool and sleeve were typically formed of the same relatively hard material. Such a hard material was deliberately employed so that the operative edges defining the metering orifices would not rapidly erode under the influence of the abrasive contaminant. Yet, such prior art valves would fail unpredictably when subjected to high response duty, some having only short lives, while others had longer.

The foregoing deficiencies of the prior art are believed to be overcome or substantially reduced by the present improvement, which essentially provides a bimetallic valve spool. The metering edges and lands of the spool continue to be formed of a relatively hard material, such as 440C stainless steel and the like, having a hardness of $R_c55-65$, on one surface hardened to like effect. However, the improved spool has the bearing lands formed of a relatively soft material, such as bronzes and the like, having a hardness in the range of $R_b45-100$. The use of such a soft bearing material is believed to have a number of significant advantages. First, being of dissimilar metals, the sleeve and bearing lands are not prone to welding. Secondly, interfering contaminant particles between the bearing lands and the sleeve, may embed themselves in the soft bearing material. This will effectively remove their presence. Thirdly, surface irregularities resulting from manufacturing or particle damage will self-heal because the soft bearing material will locally yield and rub smooth.

While such soft bearings are shown as being provided on the marginal end portions of the spool in the preferred embodiment, they may be provided at other locations as well. Indeed, if desired, the spool could be formed of the hard material or otherwise surface hardened, and the soft bearings could be provided on the sleeve. For example, the segmented bushing disclosed in FIG. 2 of U.S. Pat. No. 3,103,739 could be fabricated with high hardness materials for the flow metering segments (indicated at 102, 103, 104 in said patent), and softer hardness materials used for the end segments (indicated at 100, 101 in said patent) which mate with the outer lands of the valve spool. The use of 440C stainless steel is merely illustrative of one type of hard material. As used herein, the term "relatively hard" means a hardness of about $R_c55-65$. By the same token, bronze is merely illustrative of one type of soft material. As used herein, "relatively soft" means a hardness of about $R_b45-100$.

Therefore, while the preferred embodiment of the present invention has been shown and described, and several modifications thereof discussed, persons skilled in this art will readily appreciate that various additional changes and modifications may be made without departing from the spirit of the invention, as defined by the following claims.

What is claimed is:

1. In a valve having a spool member slidably mounted within a sleeve member, said sleeve member having an inwardly-facing cylindrical surface and penetrated by a plurality of ports through which fluid may flow, said spool member having a plurality of metering lands cooperating with said sleeve member ports such that the relative positions between said members may define metering orifices between said lands and ports through which fluid may selectively flow, the outwardly-facing surfaces of said lands being arranged in common imaginary cylinder, and wherein said members are formed of a relatively hard material, the improvement which comprises:

a bearing land provided on said spool member and adapted to slidably engage the facing proximate cylindrical surface portion of said sleeve member, said bearing land having a diameter substantially equal to the diameter of said imaginary cylinder and being formed of a relatively soft material having hardness of from about $R_b45$ to about $R_b100$, whereby the tendency of said members to gall at high relative velocities therebetween may be reduced.

2. The improvement as set forth in claim 1 wherein said relatively soft material is substantially less hard than said relatively hard material.

3. The improvement as set forth in claim 1 wherein said relatively hard material has a hardness of from about $R_c55$ to $R_c65$.

4. In a valve having a spool member slidably mounted within a sleeve member, said sleeve member having an inwardly-facing cylindrical surface and provided with at least one through port opening onto said sleeve surface to define a metering edge therebetween, said spool member having at least one lobe provided with an annular metering land extending radially outwardly therefrom and having an outermost cylindrical surface arranged to face said sleeve member surface, said metering land being provided with a metering edge arranged to cooperate with said sleeve member metering edge such that the relative positions of said members may define a flow-metering orifice between said edges, and wherein said metering land and said sleeve member are formed of a relatively hard material, the improvement which comprises:

a bearing land provided on said lobe and formed of a relatively soft material, said bearing land having an outermost cylindrical surface arranged to face said sleeve member surface, said bearing land being operatively arranged to resist radial loading of said lobe against said sleeve;

whereby the tendency of said members to gall at high relative velocities therebetween may be reduced.

5. The improvement as set forth in claim 4 wherein said bearing land is positioned at an end of said spool member.

6. The improvement as set forth in claim 4 wherein said outermost cylindrical surfaces of said metering and bearing lands have substantially equal diameters.

7. The improvement as set forth in claim 4 wherein said relatively hard material has a hardness of from about $R_c55$ to $R_c65$.

8. The improvement as set forth in claim 4 wherein said relatively soft material has a hardness of less than $R_b100$.

* * * * *